June 30, 1953 — W. LAUBACH — 2,643,672
GOVERNOR
Filed Oct. 2, 1948
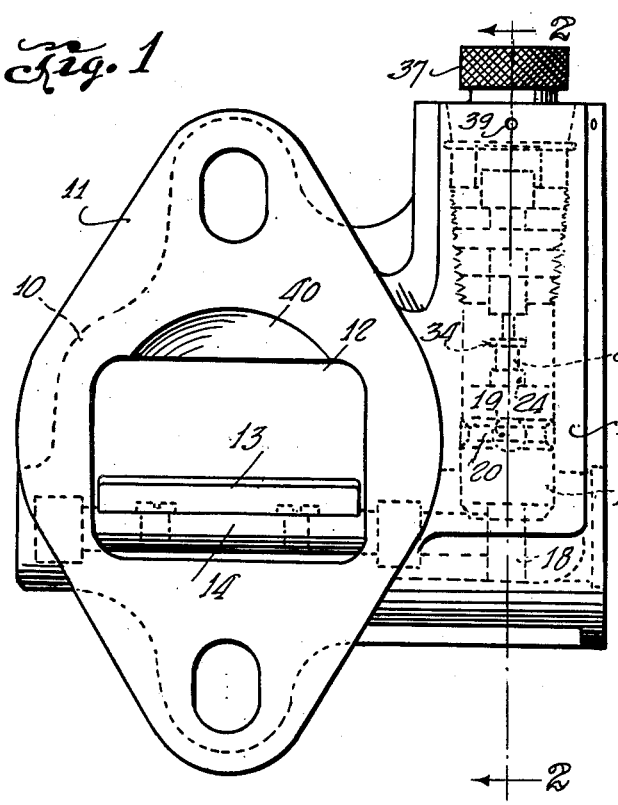
Fig. 1
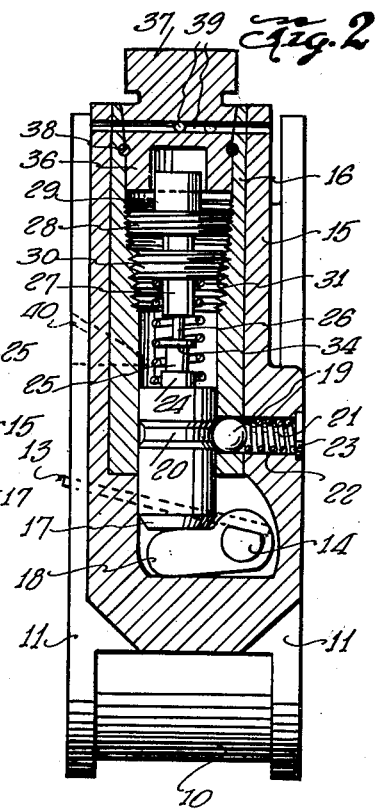
Fig. 2
Fig. 3
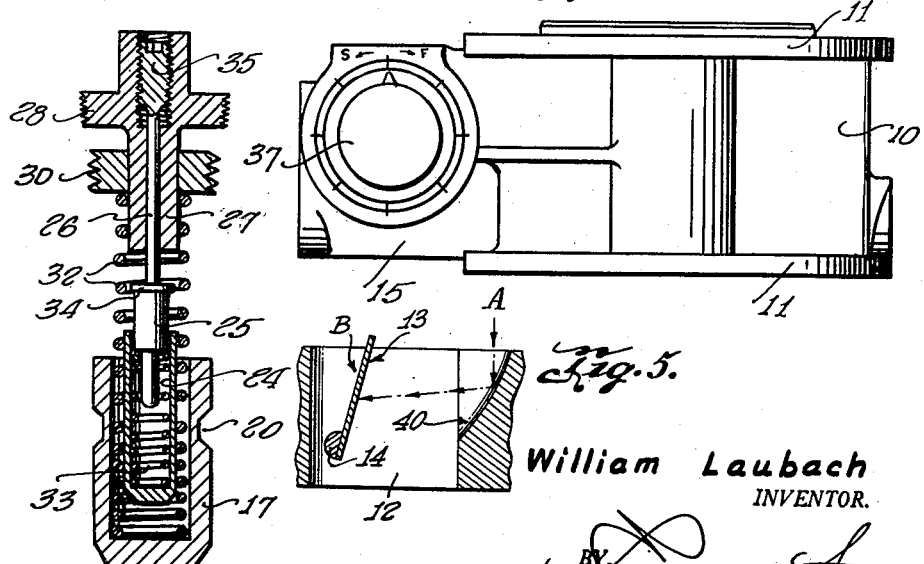
Fig. 4
Fig. 5
William Laubach
INVENTOR.
ATTORNEY Patented June 30, 1953

2,643,672

UNITED STATES PATENT OFFICE 2,643,672

GOVERNOR

William Laubach, Houston, Tex.

Application October 2, 1948, Serial No. 52,525

12 Claims. (Cl. 137—484)

This invention relates to governors for internal combustion engines and more particularly to velocity or flow type governors for predetermining the maximum speed of an automobile or other vehicle.

This application is a continuation-in-part of my application, Serial No. 715,906 filed December 13, 1946, now abandoned, and its primary object is the same as that expressed in said application: namely, to provide a governor capable of assuming control of the speed of a vehicle only when the maximum predetermined speed has been approached and to accomplish this with but minimum loss of engine horsepower.

Another object of the invention is to provide a speed governor for automobiles in which is incorporated a spring controlled piston whose movement is effected by and in accordance with the opening and closing action of a valve responding to the flow of fuel through the carburetor and through the fuel passage in the governor, said piston having an annular groove in which a spring pressed ball-detent is receivable to latch the piston in a position wherein it will hold the valve open and thereby permit the engine to develop the full power of which it is capable at speeds lower than that at which the governor is set to assume control, thereby permitting the engine to develop the high horsepower required in heavy pulls or quick acceleration. Below the speed at which the governor is set the spring control of the piston has no effect on the governor valve, and beyond such speed the closing action of the valve is resisted by ever increasing spring resistance so that the area of the passage not closed by the valve at the increased velocity will be sufficient to permit a fuel flow only great enough to maintain the desired maximum governor-limited speed.

Another object of the invention is to provide a piston controlling spring system having a non-linear characteristic, which characteristic is adjustable so that the loading curve of the spring system may be preset to match the horsepower curve of the particular engine on which the governor is to be used. My spring system includes a spring having a pitch which is varied along its length. In addition, an auxiliary piston and spring assembly is provided which auxiliary system does not become operative until the valve in the governor is partially closed. By adjusting the tensions of both springs, the overall characteristic of the governor's control action may be selected.

Still another object of the invention is to provide a stop-shoulder which is effective to limit the motion of the piston in the direction of travel of the latter when the valve is closing, thereby to prevent jamming of the valve and consequent damage to the governor. Also, this positive stop serves as a safety factor in that it prevents complete closure of the valve and thus allows sufficient fuel flow to enable the engine to operate at reduced speeds even if the governor spring system should become damaged to the extent that all springs are rendered inoperative.

Yet another object of the invention is to provide in the fuel passage of the governor an arcuate recess baffle tapered downwardly and inwardly and located opposite the governor valve so that a sudden closing motion of the valve will be cushioned by impact pressure of the fuel mixture deflected against the underside of the valve by the baffle. This pressure will also act to cushion the valve during its initial closing movement after the release of the piston from the ball-detent and before the piston contacts the auxiliary piston to increase the spring resistance against closing of the valve. This cushioning effect obviates abrupt closing movement of the valve due to the sudden release of the spring-loaded piston by the ball detent as the valve begins to close.

Other objects and advantages of my invention will become apparent during the discussion of the drawing, wherein:

Figure 1 is a plan view of the governor.

Fig. 2 is a sectional view taken on line 2—2 of Fig. 1.

Fig. 3 is a view in vertical section showing on a slightly enlarged scale the spring assembly for controlling the opening and closing action of the governor valve.

Fig. 4 is an end elevational view of the governor, and

Fig. 5 is a sectional view on a reduced scale taken along line 5—5 of Fig. 1.

Continuing with a more detailed description of the drawing, reference numeral 10 denotes the body of the governor which is preferably cast to provide upper and lower flanges 11, the lower flange normally being bolted to a fuel intake manifold while the upper flange is secured in like manner to the flange of a carburetor, not shown. Within the fuel passage 12 of the body 10 is arranged a plate valve 13, mounted on a shaft 14, one end of the latter extending into a chamber 15 formed on one side of the governor body 10 and oriented at right angles to the longitudinal axis of the shaft 14. The chamber 15 contains the governor control spring assembly which will now be described.

The chamber 15 is longitudinally bored to receive a threaded sleeve 16 which is retained in the bore by a press fit and is adapted to encase the governor control assembly. A piston 17 is reciprocably disposed in the sleeve 16 and is actuated by the valve shaft 14 through the medium of an arm 18 mounted on one end of the shaft, as shown in Fig. 2. The shaft 14 is coupled to the valve 13 which, in turn, is actuated by fuel flow through the passage 12 of the governor acting on valve 13.

Governor passages vary in size, depending upon cubic displacements of engines. The valve 13 of the governor is normally locked at a 12° angle by a ball detent 19 (Fig. 2), which is adapted, in a certain position of the piston 17, to engage in an annular groove 20 in the outer wall of the piston. A coil spring 21 is housed in a bore 22 in the wall of the chamber 15, the spring 21 imposing continuous pressure on the ball 19. A plug 23 closes the outer end of the bore 22 and retains the spring 21 in place therein.

Reciprocably arranged within the piston 17 is an auxiliary piston 24. The piston 24 is hollow and receives a plunger 25, the latter having a stem 26 which enters through a longitudinal bore made in the hexagonal shaft 27 of a range selector screw 28 whose threads engage the internal threads 29 in the end of the bore of the sleeve 16 for the purpose hereinafter stated. Slidably engaging the hexagonal shaft 27 of screw 28 is a power selector abutment 30 whose threads are of a different pitch than those of the range selector screw 28, for purposes to be explained presently, and which threads engage internal threads 31 in the bore of sleeve 16, adjacent the threads 29 therein.

Surrounding the auxiliary piston 24, plunger 25 and its stem 26, as well as the lower portion of the shaft 27 is a coil spring 32, the lower convolutions of which extend to the bottom of the bore of the piston 17 between the walls of this bore and the auxiliary piston 24. The upper end of the spring 32 bears against the underside of the power selector abutment 30 to impose a continuous pressure on the piston 17. The spring 32 is variable-pitch wound and so tensioned that the ball 19, lying in the groove of piston 17 will not be released until a predetermined fuel flow has been reached to actuate the piston 17 through closing action of the governor valve 13, thereby moving shaft 14 and arm 18. When the predetermined fuel flow has been reached, the ball 19 will be moved from the piston groove 20 against the resistance of the spring 21 and will rest upon the common surface of the piston 17. At speeds whereat the governor is limiting the fuel flow, movement of piston 17 from the position in which ball 19 engages piston groove 20 to the position in which ball 19 rests upon the common surface of piston is resisted by springs 32 and 21. The instant that the ball 19 releases the piston 17, the latter will move toward and contact the auxiliary piston 24, partially compressing spring 32 in this movement. The piston 17 and the auxiliary piston 24 will be moved back and forth as the vehicle travels over inclines and declines, thereby compensating for engine power needs under normal conditions. An auxiliary coil spring 33 one of whose ends bears against the plunger 25 and the other of whose ends bears against the bottom of the bore of auxiliary piston 24 cooperates with spring 32 in resisting movements of pistons 17 and 24 tending to close the valve 13.

Explaining further the auxiliary unit action, it will be observed in Fig. 3 that the auxiliary spring 33 has part of its coils wound in closer relationship or softer, while the remaining coils are wider apart and are therefore comparatively stiff, thereby providing a non-linear control characteristic. On level ground or during normal high speed travel of the vehicle, the close wound softer coils of spring 33 are almost fully collapsed while the stiffer coils thereof retain nearly all of their energy. When the vehicle encounters a sharp incline a severe pull is imposed on the engine and the vacuum drops in the manifold as the accelerator is depressed to maintain the vehicle speed. If the vehicle slows up somewhat, the flow of fuel decreases and it is at this point that the soft wound coils of spring 33 cause an opening movement of the valve 13. Under this action of spring 33, piston 24 tends to move piston 17 toward its original position. In moving back toward its original position, piston 17 acts on arm 18 to rotate shaft 14 and move valve 13 toward its fully open position. The final opening movement of valve 13 is caused by the force exerted on piston 17 by spring 32 which moves piston 17 to its original position where ball 19 engages groove 20, provided the fuel-flow has been sufficiently reduced.

It is to be understood that the auxiliary piston 24 is always spaced a certain distance from the bottom of the bore of piston 17 while the ball 19 is in the groove 20 of the latter. At a 30-mile speed setting, the auxiliary piston 24 will be set further from piston 17 than is shown in Fig. 2, and at a 65 M. P. H. setting it will be much closer, approximately 1/64 of an inch from the bottom of piston 17. The drawing shows an approximate 45 M. P. H. setting. It will be apparent that the spring forces resisting closing of the valve 13, due to the downward flow of the fuel from the carburetor of the engine whose speed is being governed, will vary inversely as the adjusted distance is changed between auxiliary piston 24 and piston 17. When piston 24 almost touches the bottom of the bore of piston 17, movement of piston 17 from the position in which ball 19 engages groove 20 causes piston 24 to touch almost immediately the bottom of the bore of piston 17. The closing forces exerted on valve 13 by the flow of fuel through the passage 12 are therefore almost immediately resisted by spring 33 as well as by spring 32. Valve 13, therefore, tends to remain in a nearly fully open position and the velocity of flow of the fuel mixture must increase greatly to effect further closure of valve 13. However, if plunger 25 is moved further from piston 17, the closing movement of valve 13 will be resisted only by spring 32 until piston 17 moves the distance required to bring spring 33 into play to resist further closing movement of valve 13. Thus it appears that the same closing forces on valve 13 will therefore cause a greater closing movement of valve 13 when plunger 25 is farther removed from piston 17 than when it is in closer proximity to piston 17. Since the flow of fuel mixture of the engine will be decreased when valve 13 is more fully closed, and since the speed of the engine is directly proportioned to the rate of delivery of the fuel mixture to it, assuming that the engine is pulling a load as opposed to coasting, the speed to which the governor limits the engine will be lower when plunger 25 is remote from piston 17 than when it is near piston 17, when piston 17 is in the position where ball 19 engages groove 20.

It is particularly important to observe that the plunger 25 has an annular shoulder 34 on its upper end. This shoulder affords a positive stop for piston 24 to prohibit closing of the governor valve beyond a point predetermined by the adjusted location of this shoulder. If a vehicle equipped with the present invention is allowed to coast down a sharp decline by release of the clutch, the vehicle will gather momentum and a quick re-engagement of the clutch will cause the speed of the engine to be rapidly increased. This rapid increase in speed of the engine will cause a quick increase in the velocity of flow of the fuel mixture in the passage 12 and a great closing force will be exerted on valve 13. Stop shoulder 34 will prevent an excessive closing movement of valve 13 even though the closing forces are great enough to overcome the resistance of springs 32 and 33. The presently known governors are not provided with a positive stop of the type incorporated in the described governor and are easily damaged and rendered inoperative by operators who, at high set-speeds, release the clutch on sharp declines and quickly re-engage the clutch after the vehicle has acquired considerable momentum.

Referring again to the auxiliary units, that is, the auxiliary piston 24, plunger 25 and spring 33, it will be observed that the stem 26 of plunger 25 has a calibrating screw 35 at its outer end which cooperates with threads in a bore through the range selector screw 28. Screw 35 is adapted to adjust the position of the auxiliary units 24, 25, and 33 with respect to piston 17 without changing the compression characteristic of the spring 33. Screw 35 is provided to adapt the auxiliary units 24, 25 and 33 for use with various types of vehicles whose motors have different cubic displacements, gear ratios and transmissions. The larger trucks have larger motors which require greater fuel flow and which consequently employ carburetors having larger passages. The governors employed with larger motors would have to be provided with larger passages 12, but for governors having the same size passage 12, the greater the fuel flow required by a more powerful motor for any particular set speed, the more nearly open the governor valve 13 must stand. Therefore, to adapt the invention to motors requiring a greater fuel flow, no change is necessary in the construction of the governor except that a larger passage 12 may be required to fit a particular carburetor. On the other hand, mere adjustment of screw 35 will accommodate the governor to motors which require different rates of flow of the fuel mixture for a certain predetermined speed.

The calibrating screw 35 is intended to be adjusted only by the manufacturer in calibrating the governor for particular motor types and sizes, and once it is adjusted it is made inaccessible by a tapered sleeve 36 entering the correspondingly tapered upper end of the bore of sleeve 16, the sleeve 36 having a range selector knob 37 formed on the sleeve 36, to which further reference will be later made. A lock ring 38 lies in an annular groove made jointly in the wall of the sleeve 36 and in the bore of the sleeve 16. A wire sealer is adapted to be inserted through a hole 39 extending through the range selector above the sleeve 36, and through both the sleeve 16 and wall of the chamber 15 and through some portion of the adjacent carburetor to prevent removing the governor and tampering therewith.

The setting of the governor for a predetermined speed is accomplished by the adjustment of screw 28 which is retracted away from arm 18 for lower speeds and advanced toward arm 18 for higher speeds. Advancement of the screw 28 will also advance the abutment 30 since abutment 30 is slidably but non-rotatively connected with the hexagonal shaft 27 of screw 28, whereby the abutment 30 is caused to turn by the rotation of screw 28. Because of the 3 to 1 pitch ratio between the threads 29 of screw 28 and threads 31 of abutment 30, the latter is advanced three times the distance that screw 28 is advanced during any advancement of screw 28.

If, for instance, the governor is set for a maximum speed of 45 M. P. H., the ball 19 will not become displaced from the annular groove 20 of piston 17 until the speed of the vehicle approaches 45 M. P. H., whereupon the piston 17 will be actuated by the arm 18 under the pressure of the fuel flow through the valve passage 12. The ball 19 will then ride upon the common surface of piston 17. However, should the vehicle be traveling on comparatively level road when the ball 19 is displaced from groove 20 of piston 17, the lower softer coils of the spring 33 will be nearly collapsed. Then on the start of a moderate incline, causing the engine manifold vacuum to drop as the accelerator is depressed, the spring 32 will start expanding and as the incline becomes greater the coils of spring 32 will continue to expand due to drop in the manifold vacuum, thereby opening the valve 13 to permit greater fuel flow to the engine to allow it to hold its speed.

As the engine strain increases, the engine slows down and draws less fuel mixture through passage 12 thereby decreasing the closing force exerted on valve 13 until valve 13 is brought back to almost its fully open position by springs 32 and 33. Spring 33 will return to its fully extended position before valve 13 is brought back completely to its fully open position and it is then that spring 32 completes the return movement of valve 13 to its fully open position. At this position piston 17 will be locked in again by ball 19 which will again be engaged in groove 20.

If the vehicle operator considers the incline sufficiently steep to require a shift of gears, a momentary release of the accelerator pedal necessary for the gear shifting will result in a momentary closing of the butterfly valve of the carburetor and a consequent reduction in velocity of fuel through the governor passage 12. Therefore the valve 13 of the governor will be exposed to less pressure, thereby relieving the springs 32 and 33 of restraint so that they will return piston 17 to a latched relationship with ball 19, in which position of the piston 17 the governor valve 13 is fully open.

To summarize the mode of operation of the above described governor, the governor is disposed at the base of the carburetor of an internal combustion engine in the conventional manner of employment of governors of the butterfly valve type to control the flow of the fuel mixture from the carburetor to the cylinders of the engine. The speed of the internal combustion engine depends on the rate of flow of the air-fuel mixture to the cylinders. When the vehicle is first started, the engine speed is very low and it draws very little fuel mixture from the carburetor through passage 12. The closing forces exerted on valve 13 by the fuel mixture flowing through passage 12 are opposed by the resistance offered by springs 21 and 32 and the back pressure on valve 13 caused by arcuate baffle 40. Valve 13, therefore, remains in its fully open position. As the speed of the engine increases, the rate of flow of the fuel mixture through passage 12 increases, increasing the closing forces exerted on valve 13 by the flow. Valve 13, however, remains in its fully open position until the speed of the engine approaches or equals the preset speed. Until the engine acquires the desired speed, it is allowed to draw as much fuel mixture as it needs. Once the speed of the motor approaches or equals the preset speed, the closing forces exerted on valve 13 are sufficient to overcome the resistance of springs 32 and 21 and the back pressure on valve 13. Ball 19 is then disengaged from groove 20 allowing piston 17 to move toward plunger 25. In this travel, the bottom of the bore of piston 17 contacts piston 24 and further movement of plunger 17 is resisted by both springs 32 and 33. Valve 13 moves toward a closed position when piston 17 is released from the ball locked position, its position being determined by the closing forces exerted on it by the fuel flow through passage 12 and the combined resistance of springs 32 and 33 and of the back pressure on valve 13. If the speed of the engine decreases, the rate of flow of the fuel mixture decreases, the closing forces on valve 13 are decreased and springs 32 and 33 move valve 13 into a more open position allowing more fuel mixture to reach the engine, thereby increasing its speed sufficiently to again reach the preset speed. If the speed of the engine increases, the converse of the above events occurs and the speed of the engine is decreased. If the engine is subjected to a heavy load, it will begin to slow down, thereby decreasing the rate of flow of the fuel mixture through passage 12, and valve 13 is allowed to move to a more open position. If the engine slows down sufficiently, springs 32 and 33 will move piston 17 to almost its ball locked position and valve 13 to almost its fully open position. From this point only the force exerted by spring 32 and the back pressure on valve 13 will tend to move piston 17 to its ball locked position, and valve 13 to its fully open position. Once the load decreases and the speed of the engine again approaches or reaches the preset speed, valve 13 will again be allowed to move into a partially closed position to again regulate the flow of fuel mixture through passage 12.

I do not limit my invention to the exact form shown in the drawing, for obviously changes may be made within the scope of the claim.

I claim:

1. A speed governor comprising, a housing having a fuel passage therethrough and having a threaded bore communicating with said passage; a valve in said passage movable toward a closed position by the force of the fuel flowing therethrough; a piston connected to said valve and reciprocable within said bore by movement of said valve, the threads in said bore including two threaded portions of different pitch; an abutment threadedly engaging one of said portions; a first spring confined between said piston and said abutment to resist closing of said valve; a screw threadedly engaging the other of said portions and linked for unitary rotation with said abutment; a second spring disposed between said screw and said piston and being compressed therebetween after the valve has partially closed, the rotation of said screw simultaneously but unequally adjusting the spacings of both the abutment and the screw with respect to the piston.

2. In a governor as set forth in claim 1, said abutment having an aperture through its center and said screw having a shaft passing through said aperture in the direction of the piston, the shaft engaging the aperture slidably but non-rotatably; an auxiliary piston reciprocably secured on said shaft and urged toward said piston by said second spring compressed between the shaft and the auxiliary piston, the spacing between said piston and said auxiliary piston being adjustable longitudinally of said shaft to determine the point at which the closing action of said valve will cause said piston to engage the auxiliary piston and begin compressing said second spring; and the pitch of said first spring being varied along its length to provide a non-linear compression characteristic.

3. In a governor as set forth in claim 2, a spring-loaded ball detent in said bore, said piston having a ball-receiving groove therearound so located as to be opposite said detent when the valve is fully open, said ball latching in said groove and maintaining said valve open until the rate of flow of fuel therepast approaches the range to be governed by said spring system.

4. In a governor as set forth in claim 3, said valve being a plate valve pivotally mounted adjacent one side of said passage, the latter having in the side thereof opposite the valve-mounting baffle means for directing a portion of the fuel flow against the valve plate in a direction to oppose closing thereof to thereby cushion the initial closing motion of the plate as the detent disengages.

5. A speed governor for internal combustion engines comprising a housing having a fuel passage therethrough and having a bore communicating with said passage; a plate valve journaled in said passage, the flow of fuel therethrough having a closing effect on said valve; a piston reciprocable in said bore and linked to said valve for displacement by closing thereof; a governing spring system in said bore pressing against said piston to oppose closing of said valve by said flow of fuel; a spring-loaded ball detent in said bore, said piston having a ball-receiving groove so located as to be opposite said detent when the valve is fully open, said ball latching in said groove and maintaining said valve open until the rate of flow of fuel therepast approaches the range to be governed by said spring system.

6. In a governor as set forth in claim 5, said plate valve being pivotally mounted adjacent one side of said passage, the latter having an arcuate recess in the side thereof opposite the valve mounting and said recess defining a baffle for directing a portion of the fuel flow against the valve plate in a direction to oppose closing thereof to thereby cushion the motion of the plate as the ball detent disengages.

7. In a governor as set forth in claim 5, said bore having threads including two threaded portions of different pitch; a first abutment threadedly engaging one of said portions and having an aperture through its center; a first spring confined between said piston and said first abutment to resist closing of said valve; a screw threadedly engaging the other of said portions and having a shaft slidably passing through said aperture and non-rotatably engaged therewith;

a stem through said shaft and longitudinally adjustable with respect thereto; a second spring on said stem extending in the direction of said piston and being compressed thereby against a second abutment on said stem after the valve has partially closed, the adjustment of the longitudinal position of the stem with respect to the shaft altering the spacing of said second spring from said piston, and the rotation of said shaft simultaneously but unequally adjusting the spacing between both abutments and the piston.

8. In a governor as set forth in claim 7, the pitch of said first spring being varied along its length to provide a non-linear compression characteristic.

9. A speed governor for internal combustion engines comprising a housing having a fuel passage therethrough and having a bore communicating with said passage; a plate valve journaled in said passage, the flow of fuel therethrough having a closing effect on said valve; a piston reciprocable in said bore and linked to said valve for displacement by closing motion thereof; a governing spring system in said bore pressing against said piston to oppose closing of said valve by said flow of fuel; a detent in said bore yieldably latching said piston in the valve-open position, said detent releasing said piston when the rate of flow of fuel past the valve approaches the range to be governed by said spring system.

10. In a governor as set forth in claim 9, said plate valve being journaled adjacent one side of said passage, the latter having in the side thereof opposite the valve-mounting baffle means for directing a portion of the fuel flow against the valve plate in a direction to oppose closing thereof to thereby cushion the initial motion of the plate as the detent disengages.

11. In a governor as set forth in claim 9, said bore having two threaded portions of different pitch; an abutment threadedly engaging one of said portions; a first spring confined between said piston and said abutment to resist closing of said valve; a screw threadedly engaging the other of said portions and linked for unitary rotation with said abutment; a second spring disposed between said screw and said piston and being compressed therebetween after the valve has partially closed, the rotation of said screw simultaneously but unequally adjusting the spacings of both the abutment and the screw with respect to the piston.

12. In a governor as set forth in claim 11, the pitch of said first spring being varied along its length to provide a non-linear compression characteristic.

WILLIAM LAUBACH.

References Cited in the file of this patent

UNITED STATES PATENTS

| Number | Name | Date |
|---|---|---|
| Re. 19,331 | Anderson | Oct. 2, 1934 |
| Re. 20,768 | Knauss | June 21, 1938 |
| 1,461,933 | Pierce | July 17, 1923 |
| 1,550,233 | Anderson | Aug. 18, 1925 |
| 1,584,933 | Handy | May 18, 1926 |
| 1,670,357 | Hufford | May 22, 1928 |
| 1,759,936 | Cook | May 27, 1930 |
| 1,830,877 | Kirby | Nov. 10, 1931 |
| 2,100,805 | Hufford | Nov. 30, 1937 |
| 2,200,065 | Jennings | May 7, 1940 |
| 2,209,426 | Strange | July 30, 1940 |
| 2,287,036 | Hufford | June 23, 1942 |

FOREIGN PATENTS

| Number | Country | Date |
|---|---|---|
| 21,363 | Great Britain | of 1905 |